(No Model.)

J. NABER, Jr.
TEA KETTLE.

No. 485,016. Patented Oct. 25, 1892.

Witnesses.
George Cook
H. P. Kersten

Inventor
Joseph Naber Jr.
By Miller and Heddick
Attorneys.

UNITED STATES PATENT OFFICE.

JOSEPH NABER, JR., OF HAMBURG, NEW YORK.

TEA-KETTLE.

SPECIFICATION forming part of Letters Patent No. 485,016, dated October 25, 1892.

Application filed June 7, 1892. Serial No. 435,860. (No model.)

*To all whom it may concern:*

Be it known that I, JOSEPH NABER, Jr., a citizen of the United States, residing at Hamburg, in the county of Erie and State of New York, have invented certain new and useful Improvements in Tea-Kettles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

My invention relates directly to improvements in the form and operation of the bail and ears of a tea-kettle or other vessel similar to that upon which certain other improvements were granted to me by Letters Patent No. 453,788, on the 9th day of June, 1891.

The object of my present invention is, like that in the above-named patent, to hold the bail or handle in a predetermined position when not in use in order to avoid contact of the bail or handle with the heated vessel, and thereby prevent injury to the hand in lifting or carrying the vessel.

I will now proceed to minutely describe and claim my proposed improvements.

Figure 1:
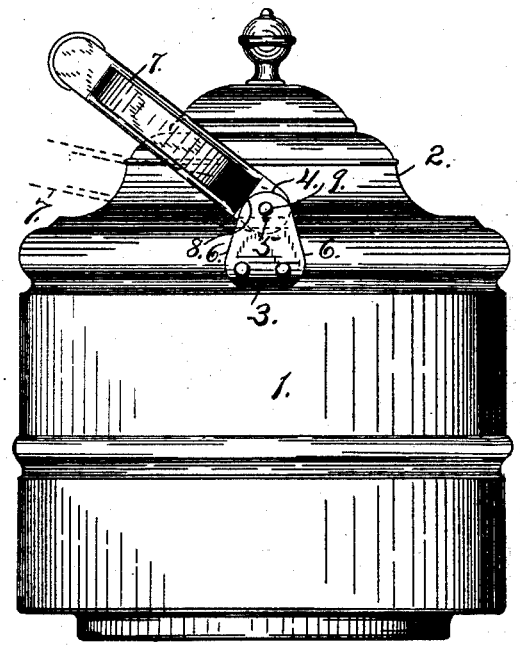
Figure 2:
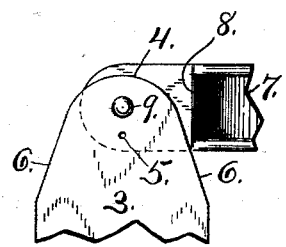
Figure 4:
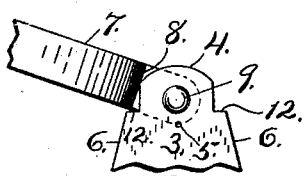
Figure 3:
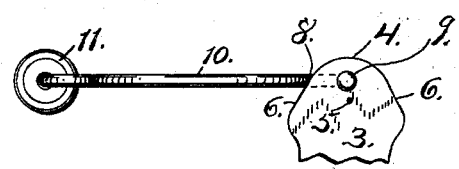

In the drawings, Figure 1 is an elevation of a vessel to which my improvements are attached. Fig. 2 is a detached detail view showing a flat sheet-metal bail. Fig. 3 is a similar view showing a wire bail, and Fig. 4 is a similar view showing modification.

Referring to the drawings, 1 is the body of the vessel, in this instance a tea-kettle, and 2 is the cover.

3 is one of the ears, of which there are two, riveted to the body of the vessel on opposite sides. The top edge 4 of this ear is the form of a segment of a circle drawn from the point 5 as a center, (see Figs. 1 and 2,) the ear widening downwardly along tangents 6 6 to the segment 4. The bail 7, having an outwardly-projecting shoulder 8 on each side, is pivoted to each ear 3 at a point 9, which is above the center 5 on the ear and between that point and the upper edge 4 of the ear.

By varying the distance of the pivot-point 9 above the point 5 the angle at which the bail will rest upon the ear when not in use can be changed correspondingly. In the drawings the bail is arranged, as shown, to rest through the engagement of the shoulder 8 with the edge of the ear at or near a horizontal position, which prevents contact with the heated body of the vessel, thus effecting the object desired. The wire bail 10, with handle 11, operates in the same manner as the flat-metal bail 7. (Shown in Figs. 1 and 2.) The modification shown in Fig. 4 presents the bail 7 of the same form; but the ear 3 has the shoulders 12 12 cut away on each side in the operation of forming the ear from a sheet of metal. It will be observed that in both forms of ears the metal forming the same is perfectly flat and devoid of any offsets or separate stops soldered or otherwise secured thereto, thus involving a simplicity and effectiveness of operation not present in the more-complicated forms now in use. It is not absolutely essential to have the upper edge of the ear in the exact form of a circle, as it might be angular or other shape; but it is essential that the shoulder on the bail should have contact only with the diverging or tangential sides at such a point on their edges as to hold the bail and handle clear of the body of the kettle for the purpose stated.

I claim—

In a tea-kettle, an ear for carrying the bail, consisting of a flat piece of metal devoid of projections and having its upper edge of the shape of the segment of a circle whose center is below the point at which the bail is pivoted, the sides being formed by diverging tangents of the segment to act in conjunction with shoulders on the bail, as and for the purpose stated.

In testimony whereof I have signed my name to this specification in the presence of two subscribing witnesses.

JOSEPH NABER, JR.

Witnesses:
BARNARD NABER,
W. T. MILLER.